May 13, 1952     D. B. DORSEY     2,596,328
CAMERA EXPOSURE CONTROL
Filed Aug. 18, 1948     4 Sheets-Sheet 1

Inventor
Dennis B. Dorsey
By Moore, Olson & Trexler
Attys.

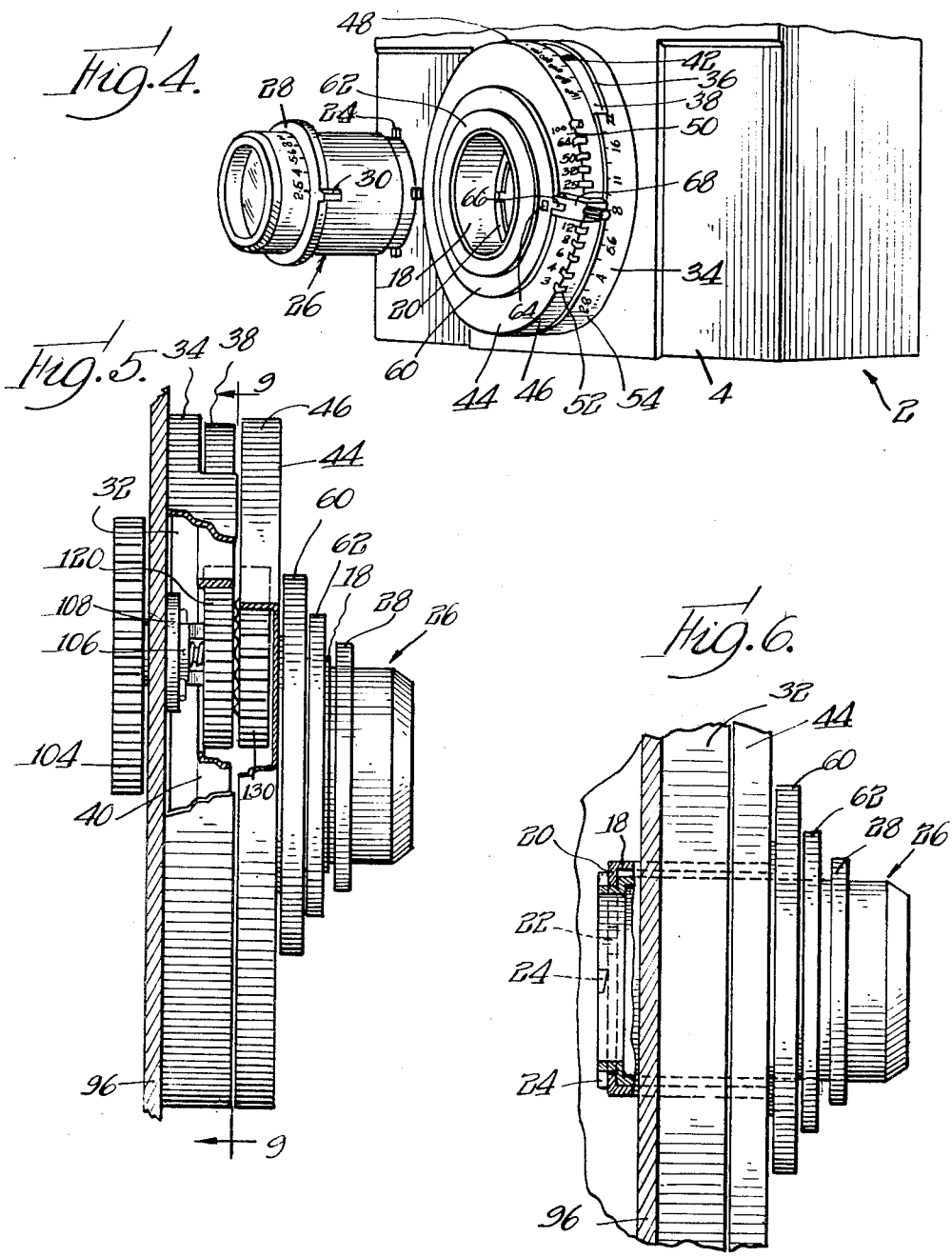

May 13, 1952
D. B. DORSEY
2,596,328
CAMERA EXPOSURE CONTROL
Filed Aug. 18, 1948
4 Sheets-Sheet 3
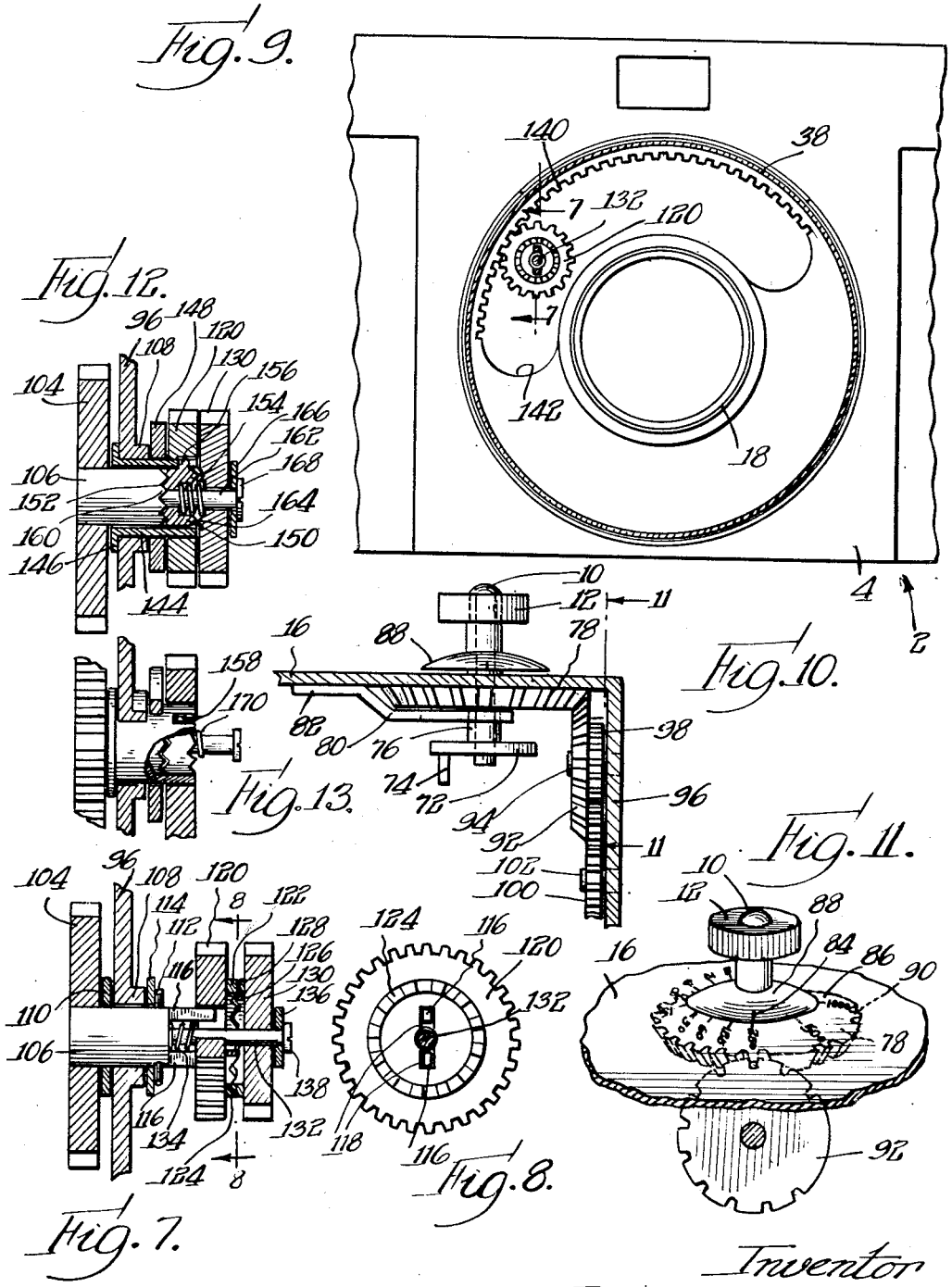
Inventor
Dennis B. Dorsey
By:- Moore, Olsood & Trefler
Attys.

May 13, 1952     D. B. DORSEY     2,596,328
CAMERA EXPOSURE CONTROL
Filed Aug. 18, 1948     4 Sheets-Sheet 4
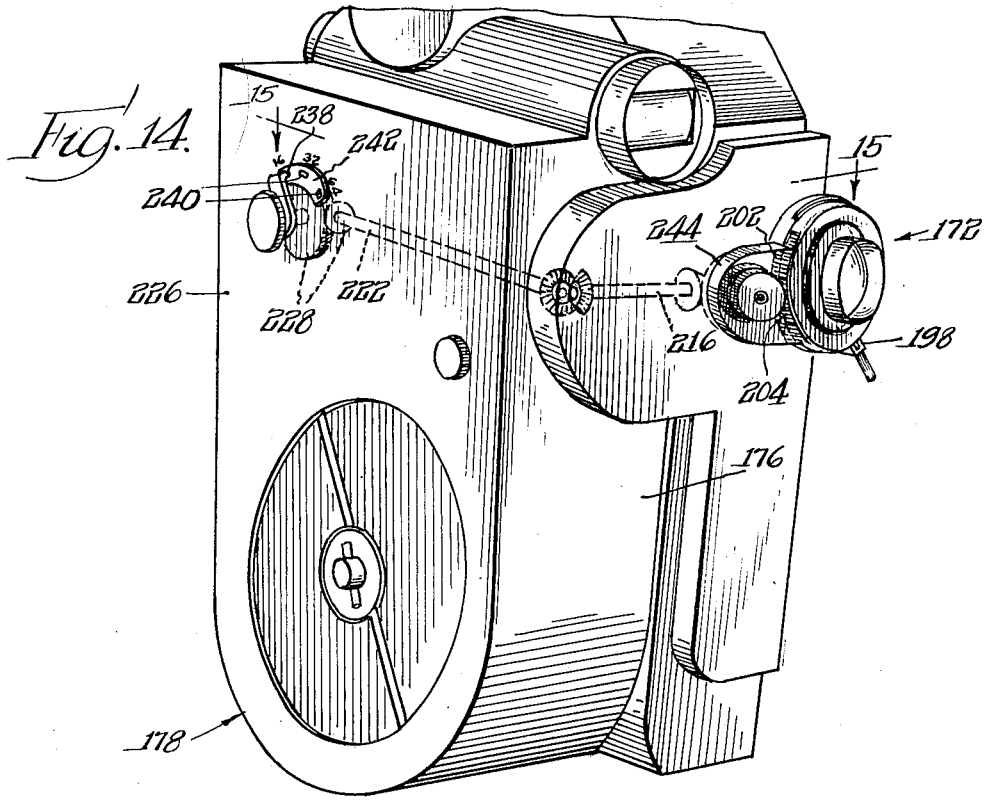
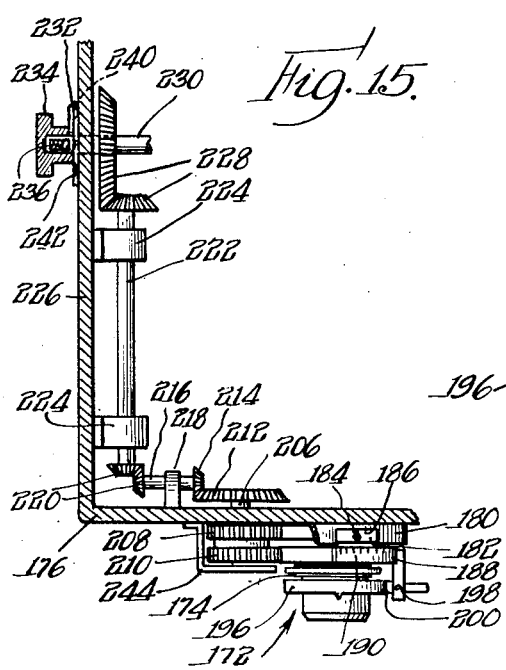
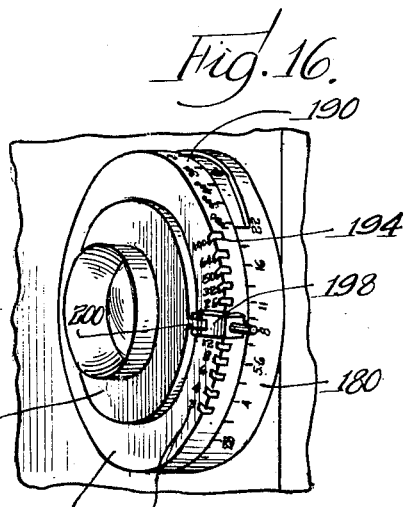
Inventor
Dennis B. Dorsey
By: Moore, Olson & Trexler
Attys.

Patented May 13, 1952

2,596,328

UNITED STATES PATENT OFFICE 2,596,328

CAMERA EXPOSURE CONTROL

Dennis B. Dorsey, Chicago, Ill.

Application August 18, 1948, Serial No. 44,855

1 Claim. (Cl. 95—64)

This invention relates to a camera, and more particularly to improvements in photographic and motion picture cameras provided or used with a photo-electric or other light sensitive exposure meter.

It is an object of this invention to provide in a camera control, means for so relating the various adjustable members of the camera, as for example the shutter speed adjustment means, or exposure interval setting means, and the diaphragm adjustment means, or exposure opening setter, that setting of the control relative to one of said adjustment means in accordance with scene brightness, as determined by the direct reading of the exposure meter, will automatically set the other adjustment means at the proper setting.

A more specific object of the invention is to provide in such a camera control as above stated, means whereby the camera having once been set according to the scene brightness, the exposure opening setting or diaphragm adjustment will be automatically varied or changed the proper amount by the adjustment of the shutter speed adjustment means.

Heretofore, in the use of an exposure meter to determine the proper setting of a camera it has been necessary first to take a reading of scene brightness in order to obtain a light rating and thereafter by utilizing that rating, determine by relative adjustment of the complicated series of dials an exposure opening or diaphragm setting and a shutter speed or exposure interval for a particular film with which the camera is loaded. It frequently happens that after this complicated series of adjustments or calculations have been made that the shutter speed or the exposure opening thereby determined is beyond the range of the particular camera or the scene brightness has changed so that the entire series of operations must be duplicated.

The present invention seeks therefore to simplify the adjustments and calculations necessary to set a camera by the use of an exposure meter in such manner that it is merely necessary at the time of taking a picture to first make a measurement of the scene brightness in order to obtain a light rating and thereafter make a single adjustment in the camera according to the exact reading of the meter without further calculations.

An ancillary object of the invention is to provide in a focal plane shutter, interchangeable lens and diaphragm type camera, control means which on adjustment in accordance with the measurement of the scene brightness automatically effects the proper setting of the exposure opening and the shutter speed.

Another ancillary object of the invention is to provide in a multi-speed motion picture camera, control means which on adjustment in accordance with the scene brightness, as measured by an exposure meter, automatically sets the exposure opening or diaphragm adjustment to the proper value for the selected shutter speed framing frequency.

Other and further objects and advantages of the invention will be apparent from the following description when taken in connection with the accompanying drawings wherein:

Fig. 4 is a fragmentary view in perspective of the camera of Figs. 1 and 2;

Fig. 5 is an enlarged, fragmentary view in vertical section taken substantially along the line 5—5 of Fig. 1;

Fig. 6 is a fragmentary view in vertical section taken substantially along the line 6—6 of Fig. 1;

Fig. 7 is a fragmentary view in vertical section taken substantially along the line 7—7 of Fig. 9;

Fig. 8 is a view in vertical section taken substantially along the line 8—8 of Fig. 7;

Fig. 9 is a view in vertical section taken along the line 9—9 of Fig. 5;

Fig. 10 is a fragmentary view in vertical section taken substantially along the line 10—10 of Fig. 2;

Fig. 11 is a fragmentary view in perspective section taken substantially along the line 11—11 of Fig. 10;

Fig. 12 is a view similar to Fig. 7 showing a modification of the coupling;

Fig. 13 is a view similar to Fig. 12 but certain parts being removed and others cut away for purposes of illustration;

Fig. 14 is a view in perspective of a motion picture camera embodying the invention;

Fig. 15 is a fragmentary view in horizontal section taken substantially along the line 15—15 of Fig. 14; and Fig. 16 is an enlarged view in perspective of the diaphragm adjusting unit of the camera shown in Figs. 14 and 15.

Figure 1:
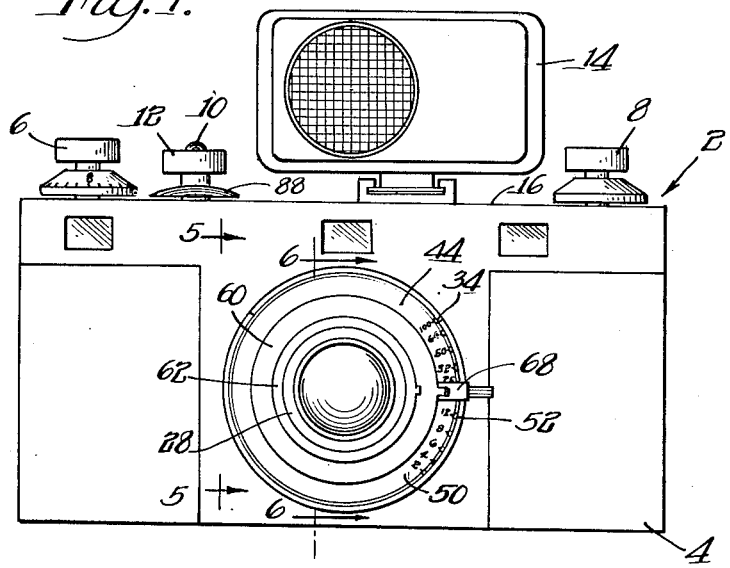
Fig. 1 is a front view of a focal plane shutter, interchangeable lens and diaphragm type camera embodying the present invention.
Figure 2:
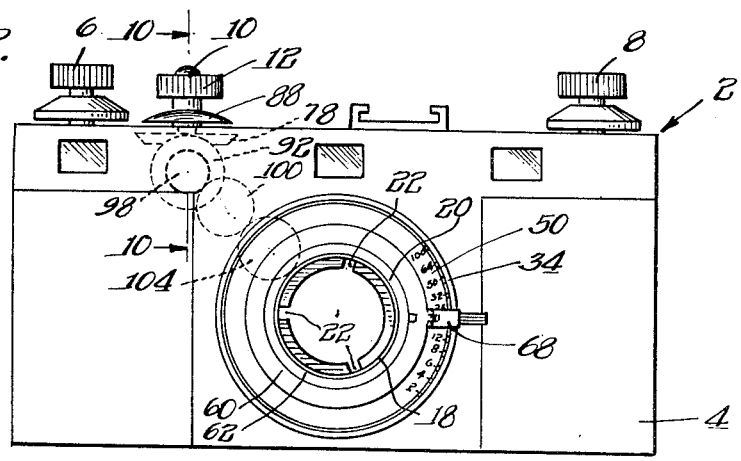
Fig. 2 is a front view similar to Fig. 1 with lens-diaphragm unit removed and additional internal parts shown in dotted lines.
Figure 3:
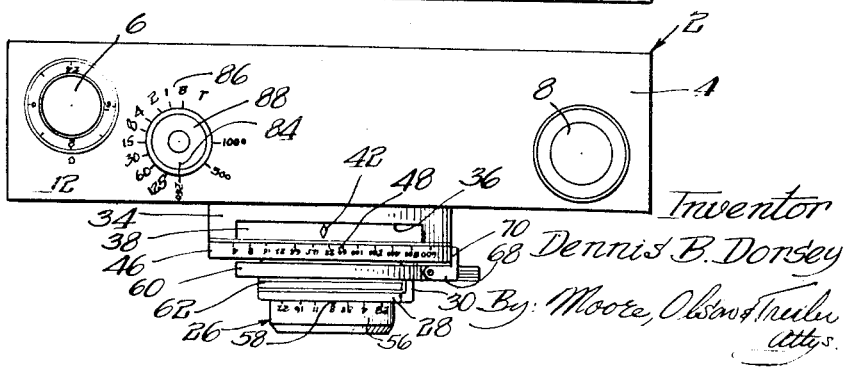
Fig. 3 is a top plan view of the camera of Figs. 1 and 2.

As shown in Figs. 1 to 11, a camera 2, as for example a focal plane shutter, interchangeable lens-diaphragm type camera, embodying the invention may comprise a camera case 4 of a well known form comprising the usual film-receiving means and film-feeding means (not shown), including film-winding knob 6, film-rewinding knob 8, the film being moved on operation of the knob 6 past a focal plane shutter (not shown) operated by shutter release button 10 and controlled by the usual shutter speed adjustment means including shutter speed adjusting knob 12.

A photoelectric or other light sensitive exposure meter 14 is detachably secured in any desired manner to the top wall 16 of the camera case 4.

The camera also includes a conventional lens-diaphragm mounting tube 18 secured to and projecting forwardly from the camera case. This tube is provided at its inner end with an inturned flange 20 having a plurality of radial notches 22 to receive the radially and arcuately beveled mounting lugs 24 on the reduced inner end of the barrel of the usual interchangeable lens-diaphragm unit 26 having diaphragm adjustment or exposure opening setting means including an adjusting or setting ring 28 turnably mounted on the barrel of the unit.

The present invention provides simple and inexpensive means adaptable to the conventional camera thus far described for interconnecting the shutter speed adjustment means or knob 12 with the diaphragm adjustment or exposure opening setting means in such manner that manipulation of the shutter speed adjustment means will automatically effect an adjustment of the setting of the diaphragm adjustment or exposure opening setting means but the adjustment of the diaphragm will not effect adjustment of the shutter speed adjustment means.

As shown in Figs. 1 to 11, such means may comprise a drum 32 having a central opening to permit its placement over the lens mounting tube 18 and being secured to the front wall of the camera case 4. The drum provides a ring 34 coaxial with the lens mounting tube 18 and the ring has an arcuate opening 36 in its upper portion to expose the annular rim 38 of a circular plate or drum 40 journaled in the ring 34 and on the lens mounting tube 18. The rim 38 is provided with a marker 42.

A circular plate or drum 44 having an annular rim 46 of preferably the same radius as the ring 34, is also journaled on the lens mounting tube 18 forwardly of the drum 32. The rim or ring 46 is provided with a light rating or scene brightness scale 48 corresponding to the direct scene brightness or light rating readings of the exposure meter 14 and cooperating with the marker 42 on the rim or ring 38. The front face of the circular plate 44 is provided with a film speed scale 50, the indicia of the scale cooperating with notches in the rim or front face of the circular plate 44. Notches 52 and the corresponding indicia of the scale 50 are equally spaced from each other by the same number of angular degrees.

The ring 34 may for convenience be provided with an exposure opening or diaphragm setting scale 54, although this is not essential since the lens diaphragm unit may have the usual diaphragm setting scale 56 cooperating with the pointer 58 carried by the adjusting ring 28.

Means for detachably coupling the circular plate 44 to the diaphragm adjusting ring 28 may comprise the coupling ring 60 secured on the lens mounting tube 18 as by a clamping ring 62 which may be internally threaded for threading on external threads at the forward end of the lens mounting tube. The coupling ring 60 is provided with a notch or opening 64 to receive the coupling lug 30 extending rearwardly from the adjusting ring 28. The coupling ring 60 is also provided with an outwardly directed radial lug 66 which is pivotally secured to a coupling finger 68 having a lug 70 for interengagement with the notches 52 in the circular plate 44. The drums 32 and 40 are interconnected with the shutter speed adjusting knob 12 for simultaneous movement therewith by the mechanism now to be described.

In the conventional focal plane shutter camera the adjusting knob 12 is secured to a stud having on its lower end a plate 72 carrying a depending pin 74, the knob on raising disengaging the pin 74 from a companion part (not shown). On turning of the knob 12 the raised pin 74 is then rotated relative to a companion part and then depressed to re-engage the companion part in a different angle or position thereby to determine a different exposure time or shutter speed. In accordance with this invention the knob 12 is interconnected with the shutter speed adjusting plate 72 by a shaft 76 splined to a beveled gear 78 so that the shaft may be raised to raise the plate 72 on lifting of the knob 12 and the beveled gear 78 turned with the plate 72 on turning of the knob 12. The beveled gear 78 is held axially on the shaft 76 between the top wall 16 of the camera case 4 and an arm 80 of a bracket 82 secured to the inner surface of the wall 16, the arm 80 being apertured to receive the shaft 76 and being spaced from the wall 16 to underlie the beveled gear 78. The knob 12 and the shaft 76 are made hollow, and the plate 72 is provided with a central opening, through which the shutter release button 10 projects and is connected in the conventional manner to the shutter release mechanism. The knob 12 has a marker 84, Fig. 3, cooperating with a shutter speed scale 86 inscribed on the top wall 16 of the camera on a plate secured to the top wall and underlying a marker containing ring 89 of the knob 12.

It is to be noted that the indicia of the scale 86 are not spaced at equal angles because the usual type of shutter speed adjustment means requires that the adjustment knob be turned at progressively different angular distances in moving from one shutter speed setting to another. Shutters and shutter speed adjustment means wherein the adjustment from one shutter speed setting to another is accomplished by equal angular movements of the adjusting knob are however known (see for example the patent to Kuppenbender 2,117,429), and such shutter and shutter speed adjustment means may be used if desired in the camera constructed in accordance with the present invention. However, it is preferred to employ the shutter adjustment means of the conventional focal plane shutter camera for by such employment a minimum modification of the present camera construction is required. In order to permit different angular movements of the shutter speed adjusting knob 12 to effect equal angular movements of the drums 40 and 33, the beveled gear 78 is provided with teeth 90 which are spaced at unequal angular distances corresponding to the indicia of the scale 86, as shown in Fig. 11, there being one tooth 90 for each indicia of the scale 86 excepting only the time exposure indicia T since when set for time exposure the opening and closing of the shutter is determined by the photographer rather than by the camera.

The beveled gear 78 constitutes the driving gear of an intermittent motion mechanism of which the driven gear 92 comprises a beveled gear having tooth spaces angularly spaced equally about the periphery of the gear. The gear 92 is journaled on the pin 94 secured in any convenient manner to the front wall 96 of the camera case 4. The gear 92 is pinned to a spur gear 98 also journaled on the pin 84 and meshing with a gear 100 journaled on pin 102 secured to the camera wall 96. The gear 100 in turn meshes with a gear 104 fixed to a stud shaft 106, Fig. 7, projecting through the front wall 96 of the camera case. The front wall 96 is provided with a circular outwardly extending flange 108 forming a journal for the shaft 106, the shaft being secured against axial movement by a spacing washer 110 between the gear 104 and the inner surface of the wall 96 and by radial pins 112 externally of the wall. The washer 114 is interposed between the pins 112 and the flange 108. The shaft 106 is provided with diametrically opposite forwardly extending lugs 116 received in complementary openings in complementary and diametrically opposite slots 118 in a spur gear 120. The lugs 116 serve as a splined connection between the shaft 106 and the gear, 120 causing the gear to rotate with the shaft but permitting it to move in a direction axially of the shaft. The gear 120 is provided with a reduced forwardly projecting portion or annular flange 122 having forwardly directed preferably V-shaped teeth 124. The teeth 124 register with the like teeth 126 formed in a rearwardly directed flange or reduced portion 128 of a gear 130. The gear 130 is journaled on a pin or stud 132 which passes through the gear 120 along the axis thereof and is threaded at its rear end into the shaft 106. A coil spring 134 interposed between the shaft 106 and the rear face of the gear 120 urges both gears outwardly, the gears being retained on the pin 132 by a washer 136 and a head 138 of the threaded pin 132.

The shaft 106 is mounted in offset radial relation to the axis of the rings 38 and 46. The ring 38 is provided internally with gear teeth 140 meshing with the gear 120, and the ring 46 is similarly provided with gear teeth (not shown) meshing with the gear 130. The end wall of the drum 40 which provides the ring 38 is provided with an arcuate slot 142, as illustrated in Fig. 9, to permit passage of the shaft 106 and the reception of the gear 120 and permit the drum to rotate with respect to the fixed shaft 106.

Whenever the shaft 106 is rotated the gear 120 rotates with it and through the toothed flanges 122 and 128 the rotation of the gear 120 is transmitted to the gear 130 so that the rings 38 and 46 rotate together. Whenever the ring 46 is turned, the shaft 106 being locked against movement, the V teeth 126 of the annular flange 128 will act as cams forcing the gear 120 inwardly against the axis of spring 134 and the teeth 126 will therefore ratchet past the teeth 124, thereby permitting the ring 46 to be rotated manually without rotating the ring 38.

The shaft 76 is held against rotation except when the knob 12 is raised and turned by the engagement of the pin 74 in the companion part (not shown), as is conventional in the cameras of the type shown in Figs. 1 to 11. Hence the bevel gear 78 is held against rotation except when the knob 12 is raised and turned to change the shutter speed adjustment. Hence the shaft 106 is locked against movement except when the knob 12 is raised and turned. If desired the bevel gears 78 and 92 which constitute in effect an intermittent motion mechanism, may be provided with the usual locking ring surfaces so that whenever ring 46 is turned manually the force tending to turn gear 120 will not be applied to the shaft 76.

In operation, the scene brightness is measured in the usual manner by the exposure meter 14, the light rating indicating of the scene brightness is read directly from the needle of the exposure meter and the ring 46 is turned manually by swinging the coupling finger 68 arcuately until indicia of the scale 48 corresponding to the direct reading of the exposure meter is aligned with the mark of 42 on the ring 38. This turning of the ring 46 serves through the coupling finger 68, the ring 60, and the lug 30 to turn the diaphragm setting or exposure opening control ring 28 to the correct exposure setting.

When the film was originally loaded into the camera the coupling finger 68 was released from the control plate 44 by swinging it forwardly therefrom and the coupling ring 60 or the control plate rotated to bring the coupling finger into alignment with the notch corresponding to the proper film speed rating of scale 50 corresponding to the rated speed of the film placed in the camera. If the lens unit has a built-in filter or a separate filter is employed with the lens, the speed rating of the film will, as well understood, be reduced by the filter factor and therefore as different filters are employed the coupling ring 60 and the control plate 44 would be adjusted relatively to couple them together at the proper film speed rating corrected for the filter factor.

It is to be noted that the marker 42 on ring 38 is angularly set in accordance with the setting of the knob 12 of the exposure speed adjustment means. As previously indicated, the ring 46 is set, on the measurement of scene brightness, to bring the corresponding scale 48 into alignment with the pointer 42. If after this setting of the rings 38 and 46 has been accomplished for a particular scene brightness, it should be desired to change the shutter speed adjustment, the raising and rotation of the knob 12 causes rotation of the shaft 106 through the gear train consisting of the gears 78, 92, 98, 100 and 104. The rotation of the shaft 106 causes simultaneous rotation of the gears 120 and 130 and consequent simultaneous rotation of the rings 38 and 46. The rotation of the ring 46 causes, as previously indicated, simultaneous rotation of the diaphragm adjusting ring 28 and hence automatically resets the exposure opening to the correct value.

On a change in the scene brightness, the rotation of the control plate 44 brings a corresponding new number of scale 48 in alignment with the marker 42. The gear 130 is rotated, but the exposure speed adjustment means being locked in position, the shaft 106 is also locked and consequent rotation of the gear 130 serves automatically to disconnect the gear 130 from the gear 120 and consequently the ring 38 remains stationary.

The coupling between the shaft 106 and the gears 120 and 130, as shown in Figs. 7 and 8, requires sufficient space to permit the gear 120 to move axially sufficiently to engage and disengage the toothed annulus 122 and 128. In some instances it may be necessary or desirable to provide a more compact coupling, as illustrated in Figs. 12 and 13. As shown in these figures, the shaft 106 is journaled in sleeve 144 which is friction fitted in the circular flange 108 of the front wall 96 of the camera case. The sleeve has an annular mounting flange 146 at its inner end and receives at its forward end a spacing washer 148 and the gear 120. The gear 120 is keyed in the usual manner, not shown, to the sleeve 144. A collar 150 is mounted within the sleeve 144 at its forward end and has on its opposite end faces V-shaped teeth 152 and 154. The collar 150 is also provided with a radial lug 156 received in a longitudinal slot 158 in the sleeve 144.

The shaft 106 terminates within the sleeve 144 and has its forward end face provided with V-shaped teeth 160 complementary to the teeth 152 of the collar 150. The collar 150 is slidably mounted on a pin or stud 162 threaded into the shaft 106 and projecting forwardly therefrom. The gear 130 is mounted on the pin 162 and has its rear face provided with V-shaped teeth 164 complementary to the teeth 154 on the forward face of the collar 150. The gear 130 is held against outward movement on the pin 162 by a washer 166 and the enlarged head 168 of the pin. A coil spring 170 bearing against the rear face of the gear 130 and received in a circular recess in the collar 150 normally urges the collar to the position shown in Fig. 12 in which the teeth 152 of the collar mesh with the teeth 160 of the shaft 106. The coil spring also serves to maintain the gear 130 against the washer 166 and therefore in sufficiently spaced relation to the gear 120 to permit these gears to rotate relatively. It will be understood that the gears 120 and 130 of the couplings shown in Figs. 12 and 13 mesh with the internal gear teeth of the rings 38 and 46 as in the embodiment shown in Figs. 1 to 11. Hence when the shaft 106 rotates, the interengaging teeth 152 and 160 exert a camming action in an axial direction on the collar 150 against the action of the spring 170, the friction fitting of the sleeve 140 in the circular flange 108 insuring the axial movement of the collar 150 prior to the rotation of the sleeve 144. When the collar 150 is thus urged axially outward, it couples the sleeve 144 to the gear 130 so that the sleeve 144 turns with the shaft 106 and the sleeve drives both the gear 120 and the gear 130. However, the gear 130 is normally disconnected from the collar 150, due to the action of the spring 170, and hence the gear 130 can be freely turned, by rotating the ring 46, and without causing rotation of the gear 120.

It will be evident that the exposure opening may be preselected by first rotating the control plate 44 or coupling ring 60 to the desired exposure opening value and thereafter, on measurement of the scene brightness, the ring 60 held against rotation while the speed adjustment knob is rotated until the marker 42 is aligned with that value of scale 48 which corresponds to the measured scene brightness.

As shown in Figs. 14 and 15, a motion picture camera embodying the invention may comprise in a conventional motion picture camera construction including a front lens and adjustable diaphragm unit 172 received in the usual mounting tube 174 projecting forwardly from the front wall 176 of the conventional camera case 178. A drum 180 corresponding to the drum 32 of the camera shown in Figs. 1 to 11 is mounted on the front wall 176, the ring flange of this drum being concentric with the lens tube 174. A ring 182 corresponding to the ring 38 is journaled in the ring flange of the drum 180 and is provided with a marker 184 corresponding to the marker 42 and exposed within an arcuate slot 186 in the ring flange of the drum 180. A control plate 188 similar to the control plate 44 is mounted on the lens tube 174 adjacent the drum 180 and the ring 182 and its external surface or its ring flange is provided with a scale 190 corresponding to the light rating scale 48 and a film speed scale 192 corresponding to the speed scale 50. The control plate 188 is also provided with a series of notches 194 aligned with the indicia of the film speed scale 192 and corresponding to the notches 52 of the camera shown in Figs. 1 to 11. The control plate 188 is detachably coupled to the diaphragm adjustment means or exposure opening control ring 196 as by a coupling finger 198 pivoted on a lug 200 extending radially from the ring 196, the coupling finger 198 corresponding in shape and form to the coupling finger 68 as heretofore described.

The ring 182 is externally toothed as indicated at 202 in Fig. 14 and the ring flange of the control plate 188 is also provided with external gear teeth as indicated at 204 in Fig. 14. A shaft 206 is mounted in any convenient manner in the front wall 176 of the camera case and projects both internally and externally therefrom. On its outer end the shaft carries gears 208 and 210 corresponding to the gears 120 and 130 and similarly coupled to the shaft 206 as illustrated in Figs. 7 and 8 or Figs. 12 and 13. The gears 208 and 210 mesh with the external teeth 202 and 204 of the ring 182 and the control plate 188.

On its inner end the shaft 206 has secured to it a beveled gear 212 which meshes with the beveled gear 214 on the shaft 216 journaled in a bracket 218 secured internally of the camera case to the front wall 176. The shaft 216 is coupled by beveled gears 220 to a shaft 222 journaled in brackets 224 secured to the sidewall 226 of the camera case 178. The shaft 222 is coupled by intermeshing beveled gears 228 to the adjustable shaft 230 by means of which the camera is set to take pictures at different framing frequencies. The shaft 230 projects from the sidewall 226 of the camera case. Externally of the case the shaft carries a latch lever and pointer 232 which is secured to an adjusting knob 234 splined to the shaft and normally urged inwardly so that the latch 238 may engage one of the keeper notches 240 of the plate 242 secured to the outer surface of the wall 226 of the camera case. The camera adjacent the plate 242 is inscribed with suitable indicia indicating the setting of the shaft 230 to take pictures at sixteen frames per second or 32 frames per second or 64 frames per second. The latch 232 serves to hold the shaft 230 and consequently the shafts 222, 216 and 206 against movement when the control plate 188 is adjusted by manipulation of the finger piece 198.

The use and operation of the motion picture camera shown in Figs. 14 to 16 will be evident from the description of the use and operation of the camera shown in Figs. 1 to 11.

A housing 244 for the gears 208 and 210 and the coupling between them may be secured in any convenient manner to the front wall 176 of the camera case and extend over the gears in juxtaposition to the drum 180, the ring 182, and control plate 190. If desired the housing 244 may be made integral with the drum 180, the ring flange of the drum being somewhat larger in radius so as to extend at one side thereof over the external teeth along the ring flange of the drum 190 as well as the external gear teeth on the ring 182.

From the foregoing description it will be evident that applicant has provided in a camera control means for so relating the various adjustable members of the camera, as for example the shutter speed adjustment means or exposure interval setting means and the diaphragm adjustment means or exposure opening setter, that setting of the control relative to its shutter speed adjustment means in accordance with scene brightness, as determined by the direct reading of the exposure meter, to automatically set the camera for taking of the picture at the proper exposure opening for diaphragm adjustment. Applicant has provided in such a camera control means as above stated wherein the camera having been set according to the scene brightness, the proper exposure opening or diaphragm adjustment will be automatically varied or changed the proper amount by the adjustment of the shutter speed adjustment means. He has also provided in a focal plane shutter, interchangeable lens and diaphragm type camera, control means which are governed by the measurement of the scene brightness to effect the proper setting of the exposure opening or the diaphragm adjustment to agree with the selected shutter speed setting or adjustment; and in a multi-speed motion picture camera control means which on adjustment in accordance with the scene brightness, as measured by exposure meter, automatically sets the exposure opening or diaphragm adjustment to the proper value for the selective shutter speed framing frequency.

It will be obvious that changes may be made in the form, construction and arrangement of the parts without departing from the spirit of the invention or sacrificing any of its advantages, and the right is hereby reserved to make all such changes as fairly fall within the scope of the following claim.

What I claim is:

In a camera having a lens tube, exposure speed adjustment means and exposure opening adjustment means, a first control member rotatably mounted on said lens tube and connected to said speed adjustment means for adjustment therewith, a second control member rotatably mounted on said lens tube in juxtaposition to said first member, both of said members being rings having internal gear teeth and journaled on the lens tube, a releasable connection between the second control member and said opening adjustment means to permit relative adjustment thereof, means for governing the adjustment of said members relatively in accordance with scene brightness, means for governing the adjustment of the second member and said opening adjustment means relatively in accordance with film speed, means for holding the speed adjusting means against movement, which means are releasable to permit adjustment of the speed adjusting means and a releasable drive connection between said members for causing automatic adjustment of the opening adjustment means on adjustment of the speed adjustment means and permitting adjustment of said opening adjustment means independently of said speed adjustment means, said releasable drive connection comprising a stud, a gear journaled on said stud and meshing with the teeth of one of said rings, a rotatable shaft, a second gear meshing with the teeth of the other ring and splined to said shaft for rotation therewith and for axial movement relative thereto toward and from the first gear, spring means urging the second gear toward the first gear, and interengageable camming teeth on said gears normally urged into engagement by the action of the spring means on said second gear on rotation of the shaft and causing automatic disconnection of the gears on rotation of the first gear.

DENNIS B. DORSEY.

REFERENCES CITED

The following references are of record in the file of this patent:

UNITED STATES PATENTS

| Number | Name | Date |
|---|---|---|
| 883,607 | Andrews | Mar. 31, 1908 |
| 1,543,208 | Fairchild | June 23, 1925 |
| 1,546,060 | Carmine | July 14, 1925 |
| 1,623,998 | Cooke | Apr. 12, 1927 |
| 2,020,036 | Marks | Nov. 5, 1935 |
| 2,031,321 | Kuppenbender | Feb. 18, 1936 |
| 2,117,429 | Kuppenbender | May 17, 1938 |
| 2,194,152 | Riszdorfer | Mar. 19, 1940 |
| 2,209,156 | Fischer | July 23, 1940 |

FOREIGN PATENTS

| Number | Country | Date |
|---|---|---|
| 147,573 | Austria | Nov. 10, 1936 |